US006505391B1

(12) United States Patent
Berna

(10) Patent No.: US 6,505,391 B1
(45) **Date of Patent: *Jan. 14, 2003**

(54) PROCESS FOR MAKING A VERSATILE CLAMPING DEVICE DESIGNED TO HOLD OBJECTS WITHOUT DAMAGING THEM, SUCH A DEVICE AND ITS USE

(76) Inventor: Philippe Jean Henri Berna, Mas Liotard - Les Brousses, 30410 Molieres-sur-Céze (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 19 days.

(21) Appl. No.: 08/580,493

(22) Filed: Dec. 29, 1995

Related U.S. Application Data

(63) Continuation of application No. 08/321,589, filed on Oct. 12, 1994, now abandoned, which is a continuation of application No. 07/938,211, filed as application No. PCT/FR91/00190 on Mar. 8, 1991, now abandoned.

(30) Foreign Application Priority Data

Mar. 8, 1990 (FR) .......................................... 90 02916

(51) Int. Cl.7 ............................ B23P 11/00; B25B 1/02

(52) U.S. Cl. ............................ 29/434; 29/559; 269/88; 269/166; 269/266

(58) Field of Search ..................... 29/434, 559; 269/37, 269/43, 45, 88, 111, 118, 119, 166, 167, 254 R, 274, 275, 266, 267; 24/329, 335, 514

(56) References Cited

U.S. PATENT DOCUMENTS

| | | | | | |
|---|---|---|---|---|---|
| 1,405,325 | A | * | 1/1922 | Posch | 269/267 |
| 1,453,045 | A | * | 4/1923 | Forster | 269/267 |
| 1,540,832 | A | * | 6/1925 | Forster | 269/267 |
| 2,199,949 | A | * | 5/1940 | Davis | 269/166 X |
| 2,487,997 | A | * | 11/1949 | West | 269/3 |
| 2,510,677 | A | * | 6/1950 | Coffman | 269/166 |
| 2,781,803 | A | * | 2/1957 | Nelson | 269/166 X |
| 2,923,334 | A | * | 2/1960 | Brennan, Jr. | 269/166 X |
| 3,033,559 | A | * | 5/1962 | Lindholm | 269/166 X |
| 4,088,313 | A | * | 5/1978 | Pearson | 269/166 X |
| 4,202,540 | A | * | 5/1980 | Neff | 269/196 X |
| 4,555,100 | A | * | 11/1985 | Ditto | 269/166 |
| 4,569,511 | A | * | 2/1986 | Bell, Jr. | 269/276 |
| 4,580,769 | A | * | 4/1986 | Pappas | 269/166 X |
| 4,770,400 | A | * | 9/1988 | Questel | 269/104 |
| 4,834,352 | A | * | 5/1989 | Thornton | 269/6 |
| 5,181,702 | A | * | 1/1993 | Pettigrew | 269/166 X |
| 5,246,216 | A | * | 9/1993 | Oberst | 269/274 X |

FOREIGN PATENT DOCUMENTS

| | | | |
|---|---|---|---|
| DE | 3209984 | * | 5/1983 |
| EP | 0080960 | * | 6/1983 |
| FR | 1423020 | * | 1/1966 |
| WO | 86/02873 | * | 5/1986 |

* cited by examiner

*Primary Examiner*—David P. Bryant

(57) ABSTRACT

A method for making and a method for using a device designed to hold objects by clamping while preventing damage thereto. This device includes a cylindrical support part (1) and two arms (2), each arm having a transverse hole and at least one of these arms is carrying an elastic buffer (3) secured thereto. This buffer possesses a contact face and has under its contact face a thickness large enough so that said buffer acts as a compression spring when his contact face contacts the surface of one of the objects. And this buffer is resilient enough such that his contact face can flex and pivot to substantially conform to this surface. The support part is disposed within the transverse hole of each arm such that at least one of these arms is movable along the support part. And the buffer is disposed at a distance from the support part with its contact face approximately at a right angle to it.

18 Claims, 6 Drawing Sheets

PROCESS FOR MAKING A VERSATILE CLAMPING DEVICE DESIGNED TO HOLD OBJECTS WITHOUT DAMAGING THEM, SUCH A DEVICE AND ITS USE

This application is a continuation of Ser. No. 08/321,589, filed Oct. 12, 1994, now abandoned which is a 371 of PCT/FR91/00190 filed Mar. 8, 1991.

FIELD OF THE INVENTION

The present invention relates to a method of making a multipurpose clamping device designed for holding objects while preventing damage thereto, such a device and its use.

PRIOR ART

Among the clamping tools including two jaws, of which one can slide along a straight guide piece, some of them are totally lacking forcible pressing means, such as screws, eccentrics, springs, hydraulic means or the like. Thus Ralph K. Coffman has filed in 1945 a patent application to get the U.S. Pat. No. 2,510,077 which discloses such a tool Coffman's tool is characterized in that said guide piece comprises several (three on the drawings) parallel and distinct cylindrical rods distributed along the jaws depth, and said jaws are equipped at one of their ends with cork pads facing each other. On the other hand, small bars at each of their ends laterally link the rods to each other, the central rod being tied to these small bars. Therefore said jaws are kept imprisoned between these said small end bars. It seems that Coffman was utterly convinced that could the jaws lock by friction on the guide piece, should this guide include several rods and these rods be automatically bent for clamping. Consequently could the jaws be parallel to each other for clamping, should these ones be leaning towards each other at rest, on the cork pads side, by an acute angle.

No more he seemed to be familiar with the clamp for décor molding, called "presse-marteau" or "hammer-press", such it has been disclosed page 107, FIG. 257, in Lombard & Masviel's book, entitled "Cours de Technologie" Band 1 (for wood) and published by Dunod & Pinat in 1907in Paris. This "hammer-press" which belongs to the kind of clamping tools mentioned at the beginning of this prior art review also locks by friction, but its guide piece comprises only one rod and its jaws are essentially parallel to each other at rest. This "hammer-press" is also found, always offered made of wood (generally of hornbeam wood), in many commercial hardware catalogs. For example, it can be found in the 1910 catalog of "Charbonnel et Fils" based in Thiviers, Dordogne, France FIG. 378 of 40th plate). It can be also found in the 1924 catalog of "Etablissements F. Guitel and Etienne réunis" based in Saint-Martin street in Paris (see FIG. 2592 nof page 232). It can be as well found in the 1927 catalog of the "Forge Royale" based in Faubourg Saint-Martin street in Paris (see FIG. 306 of 32nd plate). In these catalogs, the hammer-press is presented with a guide piece comprising only one cylindrical rod and with one of the jaws fixed at one end of said rod. In addition in these catalogs, the jaws of the hammer-press are shown without any pad, made of cork or something else. But said jaws are equipped at their farthest end from the rod in front of the other jaw with a place, where a pad could be precisely bonded on. And in 1948, the same "hammer-press" is shown (see pages 27 Fillet & Combe based in Bourgouin (Isère, France). Henri Trillat has become familiar with the "hammer-press" equipped with cork pads, before becoming teacher of technical education in 1932, as he was an employee in cabinetmaking workshops (as a foreman for furniture manufacturing, at the end). Therefore, he has taught this clamp to his students from 1932. Numerous "hammer-presses" with cork pads can be found in old cabinetmaking workshops in France. A distinctive feature of the "hammer-press", such as it is represented in Trillat's book, is that the straight rod supporting the jaws is circular, whereas in the aforementioned commercial catalogues, the rod is systematically shown with a rectangular section. And this "hammer-press" is hand clamped, as Trillat states it page 83, this time in sight of figure 31 of a revision of his first work, entitled "Technologie Générale et de Spécialité en Menuiserie Ebénisterie" ("General and Special Technology for Joinery and Cabinetwork) and published by Dunod, Paris, in 1959. This "hammer-press" can be quite compared to the clamps that have been disclosed later on in the patent applications filed by Ditto in May 1981 (to get the U.S. Pat. No. 4,555,100 ) and fled by Pappas in November 1984 (PCTIUS85/00420 application). The only exception is that the guide piece in Ditto and in Pappas appears to be parted in two parallel straight rods. Pappas considers however, at the two thirds of the page 3 of his application, that the guide piece of the jaws might be made up of only one rod. Both are claiming a clamping tool comprising two jaws and a straight guide piece. One of said jaws is fixed to one end of said guide piece. The other jaw can run along said guide piece parallel to said first jaw and remaining parallel thereto at rest. Each of said two jaws is provided at a distance from said guide piece, as it is for Trillat's "hammer-press", with an elastic cork-type pad facing the other jaw.

SUMMARY AND ADVANTAGES OF THE INVENTION

The present invention is distinct from the prior art evoked before in what it consists in replacing by a substantially elastic buffer any cork pad such as the one which can be found on a jaw of Trillat's "hammer-press".

Therefore, the new clamp can conform to difficult shapes unlike what cannot do prior art clamps like the one of Coffman, or like the "hammer-press". Thus, a clamping device equipped according to the present invention comprises:

a cylindrical support part, such as a rod or a tube, with a section circular or not, and two arms each arm including a transverse hole and at least one of these arms carrying an elastic buffer secured thereto, said buffer having a contact face for contacting any object to be clamped and having under its contact face a thickness large enough so that said buffer acts as a compression spring when said buffer contacts said object, and being resilient enough such that said contact face can flex and pivot to substantially conform to the surface of said object. Said support part is disposed within said transverse holes of said arms such that at least one of said arms is movable along said support part. And said buffer is disposed at a distance from said support part with its contact face approximately at a right angle to said support part.

One at least of said two arms being movable means that one arm (the other one) might be fixed But in combination to the replacement of cork pads by substantially elastic buffers, the two arms can be selected both movable along said support and fit for being easily slipped outwards thereof and inwards again. That gives the "hammer-press" new and considerable possibilities and turns said press into a versatile tool Indeed not only the new "hammer-press " according to the present invention can be used as a clamp conforming to difficult shapes, but also, when the arms are reversed on the support part, as a spreader to press against a nook sides. And when said arms are moreover fit to be turned around it into at least two directions and other such arms are added on same support part, one gets an overlapping clamp, which is a new kind of clamp with four arms providing a spectacularly sturdy and stable clamping. And with other pairs of arms added on said support part that gives various types of ample multiple helping hands. By joining two support parts end to end with a coupler of the electrical connector type and by positioning at least one of the arms on each of said two support parts, the maximum opening is considerably extended. Such connectors, when they are multiple, make possible a parallel coupling of the rods to build multi-contact vices or to perform multidirectional clamping by bending electrical connector bars (of which the coating is usually make out of a supple plastic material). Therefore a device according to the invention can be obtained by the global method comprising the following steps of:

providing a cylindrical support part, such as a rod or a tube, with a section circular or not, providing two arms, each arm including a transverse hole and at least one of these arms carrying an elastic buffer secured thereto, said buffer having a contact face for contacting any object to be clamped and having under its contact face a thickness large enough so that said buffer acts as a compression spring when said buffer contacts said object, and being resilient enough such that said contact face can flex and pivot to substantially conform to the surface of said object, and placing said arms on said support part such that said support part is disposed in said transverse holes of said two arms and at least one arm is movable along said support part, and said buffer is disposed at a distance from said support part with its contact face approximately at a right angle to said support part.

The present invention can further be distinguished from the prior art evoked before when said substantially elastic buffers replacing the traditional cork pads are ring buffers elastic on all sides, but with a greater thickness under the contact face. There are numerous advantages of ring buffers over cork pads. First of all, there is no more need for a fastening system, such as a sticking, such as a pin and a hole, to secure the pad or buffer to the jaw. Additionally, the ring buffers can receive and support laterally other buffers fitting out others jaws, thereby enabling and facilitating all angular directions of clamping, whatever is the outline shape of the parts to be clamped. And of course, the ring buffers are easily interchangeable with differently contoured ring buffers, to seize for example pieces difficult of access. Thornton (U.S. Pat. No. 4,834,352 ) thought for his handle-equipped clamping device of totally surrounding the jaw ends with safety pads having an uniform and slight (see Thornton p.4, lines 16–17) thickness. Clearly in view of their slight thickness, the purpose of these pads was to act as protecting wedges, but not as an essential means for exerting a pressure during clamping, let alone conforming to difficult shapes. The pressure means is materialized in Thornton by a big pin —shaped spring. In the present invention, the ring buffers are constituting the pressure means for the clamping and consistently they are thicker in the clamping direction which makes possible in addition of conforming to difficult shapes. That is in what the ring buffers are differing from the safety pads of Thornton. The difference is all the more marked since Thornton's device is clearly departing from the "hammer-press" concept. It is more like a clothes peg extrapolation towards a large opening with the traditional defects of the clothes peg: jaws diverging from parallel during the clamping operation and force nearly impossible to be controlled because of the lever effect. The use of safety pads, which is otherwise classic (around pliers noses or around fingers with gloves), is not liable to fundamentally alter the performances of the clothes peg. On the contrary, the use of ring buffers, as pads, for the "hammer-press", gives thereto new properties. For example, there is the possibility in conjunction with another "hammer-press" according to the present invention, of clamping in all angular directions with an automatic control of the clamping force. That would be rather difficult if not impossible with Thornton's press.

nSo as said at least two movable and removable arms be easily slipped outwards of said support part and inwards again, the support part ends might be equipped with removable stops. Said removable stops might be of the type clips, riders, pins, keys, or sections of cylindrical supple sheath slipped on by a gentle forcing.

A device according to the present invention will be called an assembler for the rest of the description.

The clamping of an object with an assembler, comprising only two arms, consists in positioning said object between said arms, sliding said at least one movable arm along said support part so as to apply the contact face of said elastic buffer against a respective surface of said object, manually exerting pressure upon the backs of said arms in direction of said object. The force exerted by fingers or hand palms on said backs is more or less transmitted by translation against said object. This object reacts and opposes a resistance, which rises with the exerted pressure and stopping the exertion of pressure when hands feel enough resistance. Said at least one movable arm is then repulsed by said object. As a result, it tilts with respect to said support part, such that a frictional force is created between said support part and an interior surface of the transverse hole of said arm, thereby locking said arm in place with respect to said support part. When said object is replaced by nothing between said arms, same maneuver also results into locking said at least one movable arm in place with respect to said support part by tilting. Each of said arms repulses the other one.

Spreading between two surfaces is performed according to the same principle: the arms being reversed along the support part, pushing is made in the opposite direction. The clamping operation is the same when the support part is split up into several cylindrical parallel components, distributed not along the arms unlike in Coffman, Ditto or Pappas, but at a right angle to said arms.

The clamping operation is somewhat different in the approach of the movable arms when the following conditions are met:

(i) the assembler just comprises four movable arms which can be turned in two directions V-diverging about said support part, (ii) said arms are fitted out with elastic buffers, (iii) the buffers of the first two arms along said support part have their contact faces facing towards a first direction and the contact faces of the buffers of the two following arms are facing towards a second direction opposite the first one. The two first arms are V-diverging around said support part and are pushed towards the following ones, more or less positioned according to same V. Roughly the first arm buffer is facing towards the third arm buffer while the second arm buffer is facing towards the fourth arm one. But the locking principle remains the same. As soon as the buffer contact come into contact with the surfaces of the object to be clamped, the force exerted by fingers or hand palms on said first arms is more or less transmitted by translation against said object. This object reacts and opposes a resistance, which rises with the exerted pressure. Exerting of pressure can be stopped when hands feel enough resistance. Said movable arms are then repulsed by said object As a result, they tilt with respect to said support part, such that a frictional force is created between said support part and the interior surface of the transverse hole of said arms, thereby locking them in place with respect to said support part. Such a clamping operation has been called "overlapping" and such an assembly of four movable arms on a cylindrical support part has been called "overlapper" or "super-assembler".

The overlapping can be used as well for spreading. The operation is the same except those arms are reversed along the support part. A configuration halfway between a single assembler and an overlapper or super-assembler according to the present invention can be obtained by using two movable arms V-diverging facing a single third one for the clamping. Depending on the relief of the surfaces to be held, such a configuration might be sufficient.

With the overlapping which offers four contact faces, one can notice a spectacularly more vigorous and stable clamping than with an assembler comprising only two movable arms, even upon tortured patterns. When an overlapper is clamping a small wood plaque upon a table edge with about 60° as an angle for the V formed either by the first arms or by the following ones, it is extremely difficult to detach said wood plaque from the table. And however each movable arm only underwent the thrust of one finger extremity during the clamping operation. To perform such a detaching, one hand grasping the small wood plaque with all fingers and drawn itself by a human arm of medium strength is insufficient. On the other hand, it appears that it is quite possible to carry out a stable and efficient clamping even if the four buffers are pressing by their contact face at different levels upon a tortured relief. Such a possibility is of course extremely practical for the restoration of gilded artifacts such as frames and cartouches. With the sub-variant of the overlapper comprising only three arms, two first ones forming a V and a third one pressing more or less in front of the middle of the V, one can avoid obstacles which prevent from clamping oppositely. Thus when the buffers of said movable parts forming the V press the pedestal of a clock on both sides of a column, the buffer of the opposite movable arm can press against the pedestal afoot opposite the column.

If a third pair of movable arms fitted out with such buffers is added onto a bare portion of the support part of an overlapper, one gets a helping-hand. When the overlapper grasps the lateral edge of an horizontal bench or table, said third pair can hold some objects to be painted or to be worked with free hands. This helping hand is called a three-element vertical helping-hand. If to this third pair of movable arms, called a holder, is added a fourth, a fifth, etc. pair of movable arms, still placed on a bare portion of the support part, one gets successively one four-element, one five-element, etc. vertical helping hand. When each of the added pairs of movable parts, also called holders, can be turned in several directions around said support part, these auxiliary hands are even more practical.

One can get another configuration of auxiliary hands by placing along said support part, one behind the other, three pairs of movable arms fitted out with substantially elastic buffers, said buffers facing each other by their respective contact face for each pair. At one end of the support part, the two first pairs of movable arms are separately locked by clamping with each buffer having its contact face against the contact face of the other buffer at an angle not equal to zero but possibly markedly upper or lower than 90°. Along the remaining portion of the support part, the third pair of movable arms also constitutes a holder to hold objects to be painted or to be worked on with free hands. The so-built helping-hand is called for the remainder of the present specification a three-element horizontal helping-hand. It can be installed anywhere on a more or less horizontal surface because it rests on three feet: the sets of the buffers of the first two pairs of movable arms locked at one end of the support part and the other end of the last one. If to this third pair is added a fourth, a fifth, etc. pair of movable arms, still placed on the remaining portion of the support part, one gets successively one four-element, one five-element, etc. horizontal helping-hand. Nota bene: So that one of the above-mentioned helping hands could keep objects in position firmer, one overlapper can replace one holder. The interest of the just above described helping hands as compared with the traditional helping-hands lies in different aspects:

- Firstly, the holders that are equipping the helping hands according to the invention cannot with their elastic buffers scratch held pieces as the crocodile clips of the traditional helping hands can do with their teeth.
- Secondly, unlike crocodile clips these holders are provided with jaw members which can open very widely while remaining parallel to each other.
- Lastly, the helping hands according to the invention are distinctly lighter than the traditional helping hands since they do not require a heavy pedestal to keep standing, even when the holders are loaded. Four of the movable arms that are placed along the support part are sufficient to steady the basis of such kinds of helping-hands (see above). That just shows the generic power of the combination: cylindrical support part, movable arms and substantially elastic buffers.

Of course, configurations as the overlapper and the vertical and horizontal helping hands can only be built because of the possibility for the movable arms to be turned in more than one direction around the support part.

The modularity of the assemblers, which derives from the movability of the arms along the cylindrical support part, is creating a faculty not available up to now with the clamping tools: increasing at will the maximum opening. Said arms can be slipped outwards of their support part (the possible stops at ends thereof are removable) and slipped onto another support part of same section. Cylindrical support parts can be fixed end to end by couplers such as electrical connecting devices, muffs for mechanical pipes or cable links. It matters little that the couplers are barriers against the mobility of the arms between the different support parts. Placing one movable part on each of the two most extreme portions of said support parts is sufficient and the maximum opening between the two so used movable arms is inevitably larger than it would be if these two arms would be placed on only one of these support parts. In this manner the maximum opening according to the invention easily becomes extensible, which contrasts sharply with the traditional clamps where the extension of the support part is not permitted. Naturally, if not one but several movable parts are placed on each of the two most extreme portions of the support parts so connected end to end, it is possible to give a considerable maximum opening to all above disclosed original variants of the invention, as the overlapper and the new kinds of helping hands, etc. On the other hand, it can be also contemplated extending a support part with support parts having a different section by couplers the inlets of which being fit for different diameters. In this way movable arms having different dimensions could be faced to each other. Depending upon the shape of the objects to be clamped, such an arrangement dimensions could be very helpful. Connecting devices for big section electrical wires can provide couplers with inlets fit for different diameters.

According to a somewhat similar arrangement, denominated "radial clamping" on the support part of an assembler including a minimum of two movable arms is secured a coupler. This coupler is fit to seize, in at least one direction distinct from said support part direction another support part which can carry a minimum of one movable arm provided with an elastic buffer. Such a coupler is possibly made of a crosspiece like those which are used in electricity as a shunt contact or those which are used in the Navy or in "Mecano" building set to secure the crossing of two cables or halyards. It might also consist of a little bar of electrical connecting devices which is kept bent for example by the way it is secured to the first of said support parts. If this support part and another of said ones are at an angle of about 90°, it is possible to clamp things by three sides (T clamping) or by four sides (cross clamping). And when the coupler can hold several support parts in directions all distinct from the direction of the support part upon which the coupler is secured, it is possible to clamp things by numerous sides between the movable arms which are carried by said support parts. Such a way of clamping is then called a radial clamping. Of course said ways of clamping, the T one, the cross one and the radial one, can be operated with movable parts combined in over lappers. With the radial clamping, it is possible of pulling towards each other the corner sides of a frame and of gripping round objects markedly more firmly.

Another faculty brought by the invention also results from the movability of the arms along the cylindrical support part. Spreading with an assembleur of two reversed movable parts, each provided with an elastic buffer, between a surface and an auxiliary bar kept parallel to said surface makes possible to press at any place of this surface along this bar. An auxiliary bar, such as a ruler or a tool handle, can be kept parallel to a surface by the holders of two three-element vertical helping-hands of which the overlappers grip two opposite edges of said surface. There is no risk for the support part of damaging said surface if the movable part having its elastic buffer pressing the surface is slipped at one of the furthest ends of the support part since the last one does not go beyond said buffer. This kind of clamping has been called "covering clamping". Thus it is possible to press against a surface very far from its edges, provided the auxiliary bar would be large enough. In this way, the jaw depth of the movable parts is made potentially unlimited. And whatever the shape of the surface is plane, convex, concave or tortured, that is true. It is sufficient that the auxiliary bar more or less follows the outlines of the surface. For a stronger pressure, an overlapper might replace the assembler that has to be turned into a spreader. Until now this type of clamping by covering was not much familiar to persons having ordinary skill in the art, because traditional clamps could not generally be turned into spreaders and a spreader was a special tool rarely available in the workshops. In addition wedges are rather difficult to be used with a traditional spreader. According to the present invention, the covering clamping can be easily and directly executed with the very same assemblers as the ones which permit of making all the other above disclosed original arrangements, provided if needed with additional movable arms. It is the multipurpose characteristic of the new assembler.

Another worthwhile feature of the invention is that a ring buffer belonging to a clamping or spreading assembler can support against its side, under various angles, the pressure of a buffer belonging to a second assembler in clamping or spreading position. This feature results from that every elastic substance, which can go into such a buffer, is malleable and generally not slippery. Therefore the buffer of another movable arm of said second assembler can force against the side of an object even this last one has no other side parallel to said first side or against a buffer belonging to a third assembler, also in clamping or spreading position. Such a positioning permits to clamp even there is no outline easy to be seized, which is often the case of objects d'art to be restored. This positioning was so far very difficult to be achieved with traditional clamps because sizeable and crooked wedges had to be jammed under the jaws, said wedges being always uneasy to be put in and sometimes hard to be found out. Generally such a positioning was requiring more than two hands and was brutishly forcing whatever was the solidity of the objects to be clamped. This positioning turns to be elementary, even under a weak clamping force, with the new assembler, owing to the use of elastic ring buffers. It has been called angle clamping, staple clamping or bridge clamping, according to the number of assemblers, which are involved. For a firmer anchorage an overlapper might replace the supporting assembler.

The result of all the foregoing is that the assembler according to the invention is multipurpose and that its general process of use, which permits of holding a set of objects by clamping without damaging them, comprises the following steps:

positioning said set of objects between said arms, sliding said at least one movable arm along said support part so as to apply the contact face of said elastic buffer against a respective surface of said set, manually exerting pressure upon the backs of said arms in direction of said set. The force exerted by fingers or hand palms on said backs is more or less transmitted by translation against said set. This set of objects reacts and opposes a resistance, which rises with the exerted pressure and stopping the exertion of pressure when hands feel enough resistance. Said at least one movable arm is then repulsed by said set. As a result, it tilts with respect to said support part, such that a frictional force is created between said support part and an interior surface of the transverse hole of said arm, thereby locking said arm in place with respect to said support part.

Other characteristics and advantages of the invention will be more apparent from the following detailed description in view of the attached drawings, upon which:

BEST MODE FOR CARRYING OUT THE INVENTION

Figure 2:
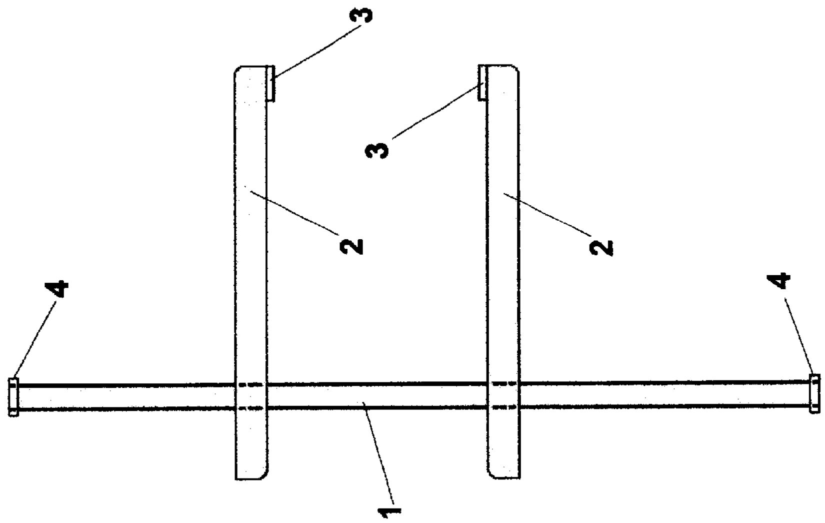
FIG. 2 is a sectional elevation of an assembler according to the invention comprising two arms, wherein each of said arms is provided with a substantially elastic slice-shaped buffer.

Referring now to FIGS. 1 to 14, a multipurpose clamp according to the present invention hence comprises in combination:

a cylindrical support part 1, such as a rod or a tube, with a section circular or not, two arms 2, each arm including a transverse hole. Said support part 1 is disposed in said transverse holes of said arms such that at least one of said arms is movable along said support part 1, one substantially elastic buffer 3 secured to one of said arms 2. Said buffer has a contact face for contacting any object to be clamped and has under its contact face a thickness large enough so that said buffer acts as a compression spring when said buffer contacts said object. Moreover said buffer is resilient enough such that said contact face can flex and pivot to substantially conform to the surface of said object. And said buffer is disposed at a distance from said support part 1 with its contact face approximately at a right angle to said support part 1.

It may be added a stop 4 at least to one end of said support part. Said stop can prevent said of arms 2 which are movable from slipping away out of said support part 1 when they are not held back on said part by some clamping action and said support is kept more or less upright.

As it has been said before, a device according to the invention has been called an "assembler". To be substantially elastic and thick enough to act as a compression spring said buffer 3 must be made of an elastic substance, supple like natural or synthetic rubber, foam plastic or even cotton, and that its thickness under the contact face must be larger than one millimeter. It can be full or spongy structured. It can also be made of a hollow flat box with thin wood, hard plastic or metal walls, which have the property of straightening up when the pressure exerted upon them is reduced. Said contact face is more or less flat or slightly bowl-shaped and its seat is mainly at a right angle to said support part. For some applications however, said contact face can be convex. Said buffer can have also the shape of a slice bonded on said movable arm or the shape of an obturator, which has a protuberance that is thrust into a hole made in said movable arm. It may have as well the shape of a ring slipped onto same arm at a distance from said support part. The advantage of a ring as a buffer as compared to a slice or an obturator is its capacity to be fixed on said arm without needing to bond or to perforate said arm. Its internal dimensions must only be smaller than or at the most equal to said arm external dimensions at the place where it has to be secured, so that it can be forcibly slipped on the arm to said place and stay locked thereon.

According to another arrangement, the buffer is made up of a pile of substantially elastic slices in the way of a Belleville washer spring. In a first sub-arrangement, slices are bonded one on top of the other. In a second sub-arrangement, slices are pierced and slipped on top of the other too by a gentle forcing onto a second cylindrical part which is parallel to said support part. Said second cylindrical part is slid and positioned behind said buffer contact face through the arm which carries said buffer and is held back by a stop similar to the ones which might end said support part.

One of said means to permit one of said movable arms 2 of sliding along said support part 1 is made of a passage hole, of which the inner shape surrounds very closely the outline of said support part 1. But such a means may also consist of a shackle secured to said arm 2 side, said shackle forming a loop. Another possibility is to shape said passage hole by building each of said arms 2 with two half-arms each provided within its thickness with a cylindrical semicircular groove, the groove hollow of each half-arm facing the groove hollow of the other half-arm. A similar possibility is to put in one side of a whole arm, within its thickness, a cylindrical groove and to close this one longitudinally by a plate; it can also be considered of wrapping a tenon piece of said arms by a hollow rail constituting said support part.

Referring to FIGS. 1 to 9 and 14, each stop 4 is composed by a section of cylindrical supple tubular sheath the diameter of which being slightly smaller than the average diameter of said support part. Said section is slipped on at end of said part by a gentle forcing. Such stops can also consist of clips, riders, pins or keys. But as compared with these last means, using some supple sheath to slip by force on said support part is an especially economical means. No machining of said cylindrical support part and no special tools for manufacturing said stops are indeed required even if said support part section is out of standards. Such a sheath can be found easily, because there is generally no special requirement, such as resistance to temperature rise or to hostile environment Only said sheath section must be a little smaller than said support part average diameter and said supple sheath must keep its elasticity in the course of time with normal environmental conditions. Can be suitable for said sheath: supple tubes of PVC, medium or low-density polyethylene, silicone, natural or synthetic rubber.

Figure 1:
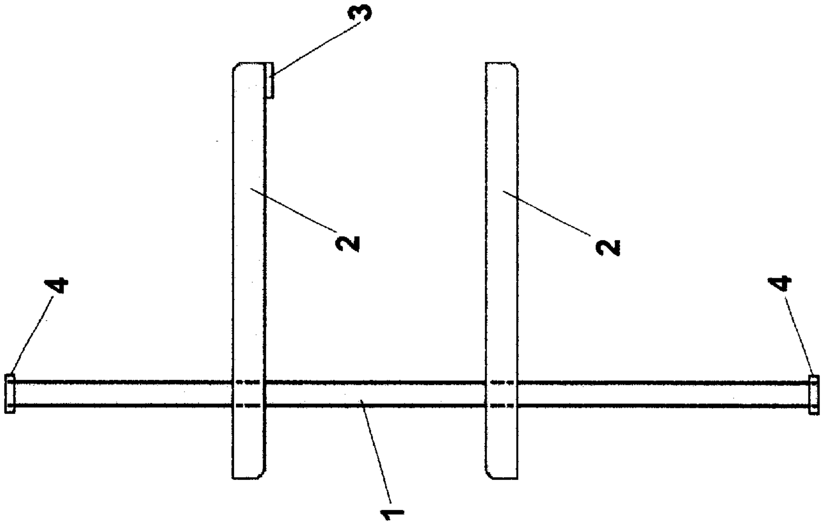
FIG. 1 is a sectional elevation of an assembler according to the invention comprising two movable arms wherein only one arm is provided with a substantially elastic slice-shaped buffer.

FIG. 1 shows an assembler according to the invention including only two movable arms 2. A single substantially elastic buffer 3 is involved. It consists of a slice adhering to its carrying movable arm 2 by bonding thereon or of an obturator, which has a protuberance that is thrust into a hole made in said arm 2.

As for FIG. 2, it shows an assembler according to the invention including only two substantially movable arms 2 where two elastic buffers 3 are employed, one per arm. Each of these buffers consists of a slice adhering to its carrying arm 2 by bonding thereon or of an obturator, which has a protuberance that is thrust into a hole made in said arm 2.

Figure 10:
FIG. 10 shows a sectional elevation of a ring buffer according to the invention.
Figure 11:
FIG. 11 shows a sectional elevation of a ring buffer according to the invention.
Figure 3:
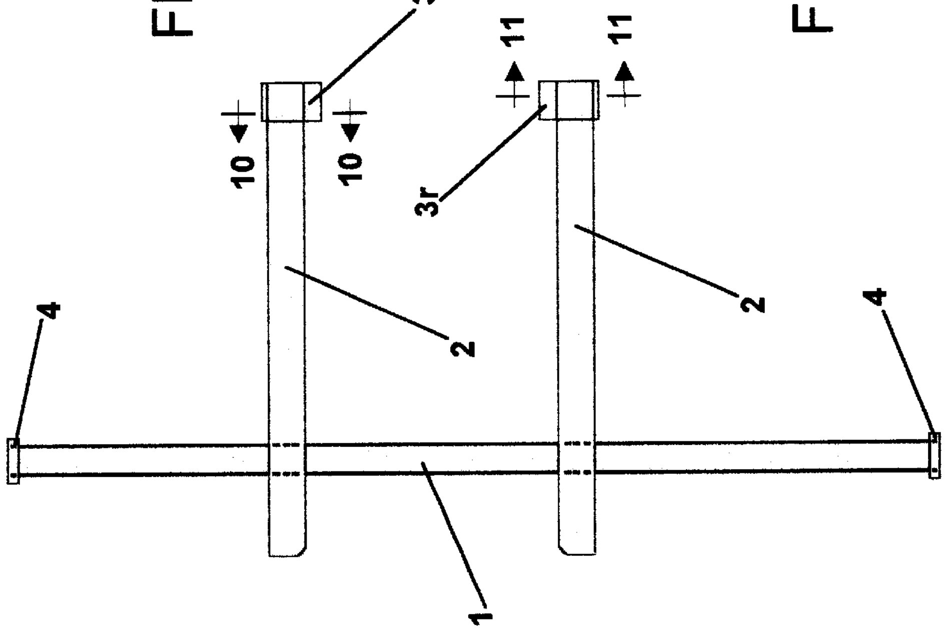
FIG. 3 is a sectional elevation of an assembler according to the invention comprising two arms, wherein each of said arms is provided with a substantially elastic ring buffer.

As for FIG. 3, it also shows an assembler according to the invention including only two substantially movable arms 2 where two elastic buffers are employed, one per arm. But each of these buffers consists of a ring 3*r* of rubber or other material or an equivalent plastic alveolar structure slipped by forcing onto its carrying arm 2. Both FIG. 10 and FIG. 11 show a ring buffer in sectional elevation.

Figure 4:
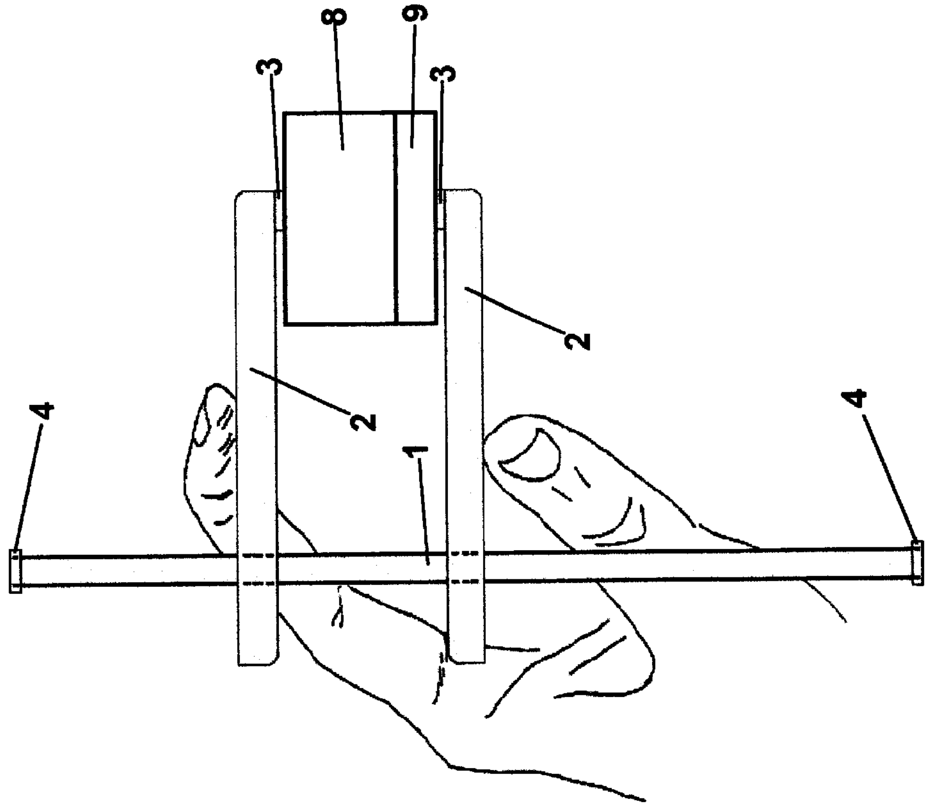
FIG. 4 is a sectional elevation showing how the assembler of FIG. 2 can be used for pressing an assembly of two objects.

In view of FIG. 4, to perform clamping with an assembler according to the invention and including only two movable arms 2 provided with substantially elastic buffers 3, it is enough of:

- positioning the set of objects 8–9 to be clamped between arms 2,
- sliding arms 2 along support part 1 so as to apply the contact faces of elastic buffers 3 against the outer surface of said set of objects,
- manually exerting pressure upon the backs of arms 2, in direction of objects 8–9. The force exerted by fingers or hand palms on said backs is more or less transmitted by translation against objects 8–9. These objects react and oppose a resistance, which rises with the exerted pressure.
- stopping the exertion of pressure when hands feel enough resistance; arms 2 are then repulsed by objects 8–9 and tilt with respect to said support part, such that a frictional force is created between said support part and an interior surface of the transverse hole of each arm 2, thereby locking said arms in place with respect to said support part.

It is worth noting that an assembler according to the invention performs as a relay of the human fingers or hands (in the sense of replacing) for the accomplishment of a task like clamping. It can actually keep a clamping position as long as it is needed under the same effort the hand(s) can temporarily hold.

Pulling the tail of said arms 2 opposite the clamping area and close to said support part 1 is enough to unlock said arms 2 and to release from clamping the set of objects 8–9.

Spreading an assembler according to the invention including only two movable arms is performed in a similar way. However, the arms must be first reversed along said support part so as to turn the contact faces of said buffers towards the outside. These contact faces are brought into contact of the objects to be held apart. The operation is then carried out further on in a way similar to the clamping operation except that the resistance to be manually felt must equal the force that it is wanted for spreading.

Figure 5:
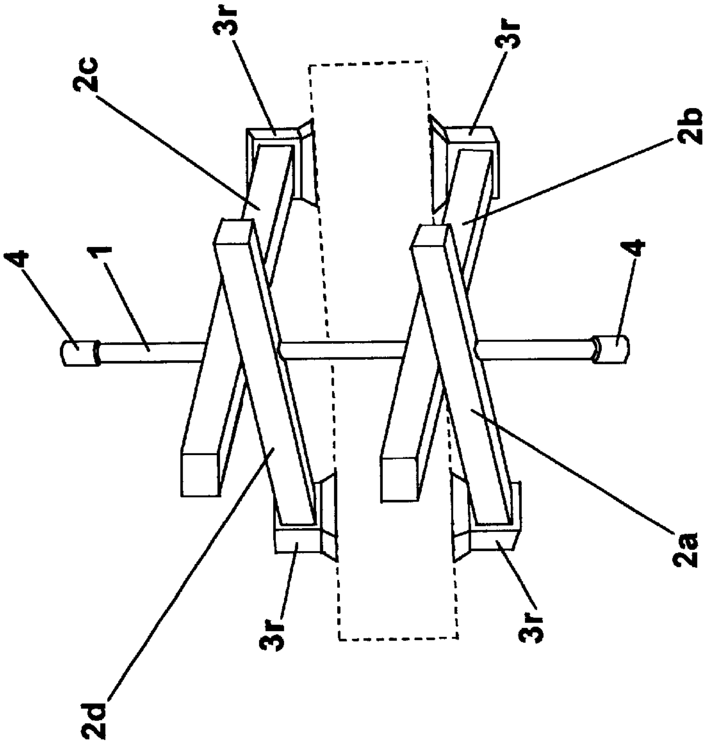
FIG. 5 is a perspective of an assembler according to the invention comprising four movable arms arranged as an overlapper wherein each one of said arms is provided with a substantially elastic ring buffer.

FIG. 5 shows a variant of the assembler including four movable arms, each of them having a substantially elastic ring buffer 3*r* secured thereto at a distance from said support part 1. Buffer 3*r* of arm 2*a* has its contact face facing towards the contact face of buffer 3*r* of arm 2*d*, while buffer 3*r* of arm 2*b* has its contact face facing towards the contact face of buffer 3*r* of arm 2*c*. Arms 2*a* and 2*b* are V-diverging about said support part and arms 2*c* and 2*d* are more or less arranged according to same V. As it has been told above, such a configuration has been given the name of “overlapper” or “super-assembler”. And the clamping operation, which consists in moving closer the two pairs of movable arms V-diverging towards each other, the name of overlapping.

The overlapping can be used as well for spreading. The operation is the same except those arms are reversed along the support part. A configuration half way between a single assembler and an overlapper or super-assembler according to the present invention consists in using two movable arms V-diverging in front of a single third one for the clamping. Depending on the relief of the surfaces to be held, such a configuration might be sufficient.

Figure 6:
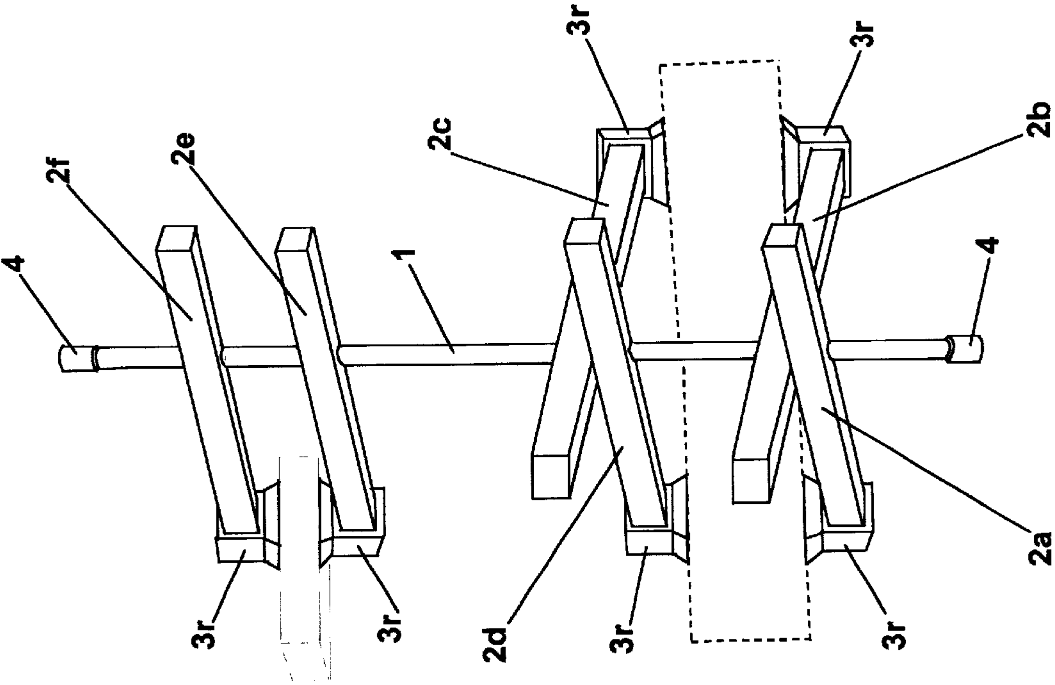
FIG. 6 is a perspective of an assembler according to the invention comprising six movable arms arranged as a vertical three-element helping hand, each arm being provided with a substantially elastic ring buffer.

As for FIG. 6, a third pair of movable arms 2*e*–2*f* called a “holder” is placed by slipping on the bare portion of the support part 1 of an over dapper comprising two pairs of movable arms 2*a*–2*b* and 2*c*–2*d* grasping the edge of an horizontal bench or equivalent. Each arm of said third pair has also secured thereto a substantially elastic ring buffer 3*r*. Such a holder in clamping or spreading position can keep in position some objects to be painted or to be worked on with free hands. Such a configuration has already been given the name of three-element vertical helping-hand.

Figure 7:
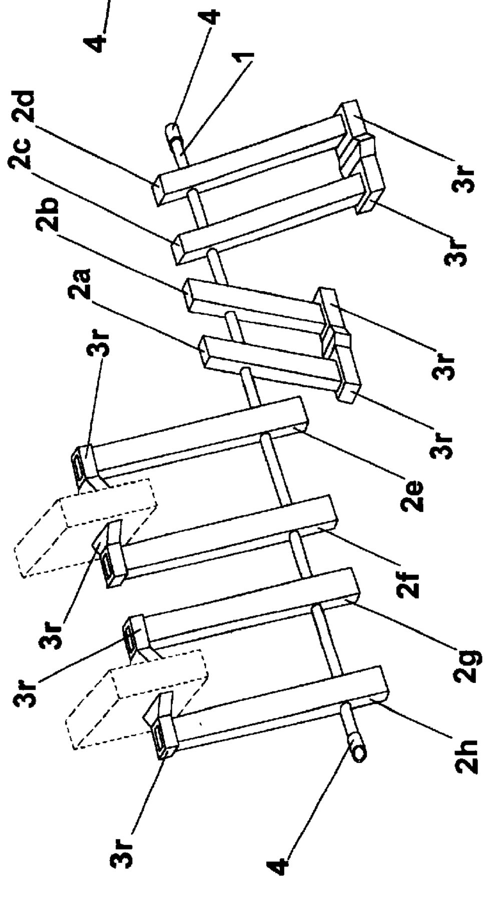
FIG. 7 is a perspective of an assembler according to the invention comprising eight movable arms arranged as a horizontal fourth-element helping hand, each arm being provided with a substantially elastic ring buffer.

FIG. 7 shows another configuration of helping-hand: a four-element horizontal helping-hand. It includes four pairs of movable arms 2*a*–2*b*, 2*c*–2*d*, 2*e*–2*f*, 2*g*–2*h*, placed one behind the other along said support part. Each of said arms has secured thereto one substantially elastic ring buffer 3*r*. For each pair of arms, either buffer has its contact face facing towards the contact face of the other buffer.

At one end of the support part, the two first pairs of movable arms 2*a*–2*b* and 2*c*–2*d* are separately locked by clamping with each buffer having its contact face against the contact face of the other buffer. The two pairs are positioned at an angle close to 70°. Along the remaining portion of the support part, the third pair of movable arms 2*e*–2*f* and the fourth pair of movable arms 2*g*–2*h* are constituting “holders” for keeping objects in position to be painted or to be worked on with free hands. Of course the buffers of the two first pairs of movable arms 2*a*–2*b* and 2*c*–2*d* locked at one end of the support part are making up with the other end of said support part a tripod. Each holder can be used as an assembler comprising two movable arms for clamping or spreading operations.

Nota bene: So that one of the above-mentioned helping-hands could keep objects in position firmer, one overlapper can replace one holder.

Figure 8:
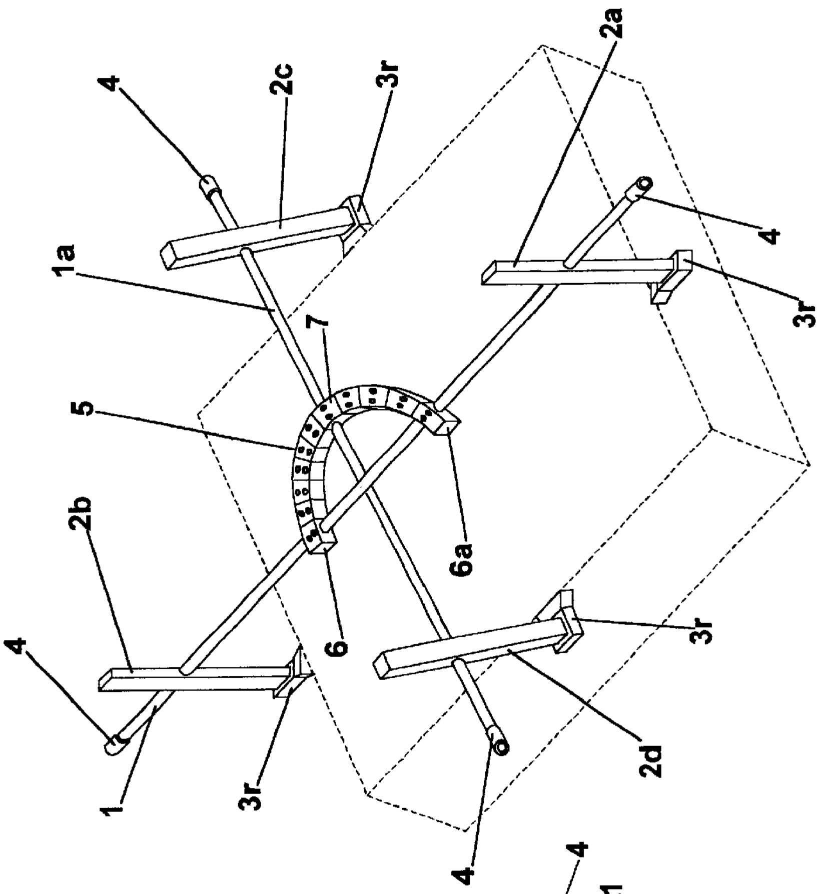
FIG. 8 is a perspective of an assembler according to the invention wherein the support part has secured thereto a coupler which supports another support part in a direction perpendicular to that of the first said support part. And said another support part is carrying two other movable arms each provided with a substantially elastic ring buffer.

FIG. 8 is showing a “radial clamping”. On the support part 1 of an assembler according to the invention is secured as a coupler a pliable little bar 5 of electrical connecting devices, which has been bent. Said support part 1 is carrying two movable arms 2*a*–2*b*, each of them having secured thereto one elastic ring buffer 3*r*. Said bar 5 is bent because it is secured on said support part I by two contacts 6 and 6*a* which are normally far from each other and which have been brought closer by torsion of the little bar within its medium plane. The screws of said contact screws are turned tight against support part 1, i.e. they are jammed against it. The middle contact 7 of the little bar is used to secure, still by screwing thereagainst, another cylindrical support part 1*a* which carries two other movable arms 2*c*–2*d,* each of them having secured thereto one elastic ring buffer 3*r.* The first support part 1 is more or less at a right angle to the other support part 1*a*. The clamping operation for each pair of movable arms 2*a*–2*b* and 2*c*–2*d* is identical to the operation for an assembler according to the invention comprising two movable arms. In this way, as illustrated in FIG. 8, it is possible to clamp things by four sides between the movable arms that are carried by these two support parts. Such a clamping has been given the name of cross clamping. It would be also possible with some additional cylindrical support parts, each of them held by other contacts of the little bar and carrying at least one movable arm, to clamp things by a vast number of sides. Such a clamping has received the name of radial clamping. In the same way, to said second support part 1*a* can be secured another coupler holding a third support part 1*b* in a direction distinct from the directions of the first two support parts. Possibly one more coupler can be secured on this third support part, and so forth to build a chained radial mounting. Such a chain configuration might be helpful to clamp the objects with complicated outlines. Another model of coupler can consist of a crosspiece including two or more pipes which are diverging and which can keep secured by a screw system or the like a support part like a rod or a tube. This kind of crosspiece is used for instance in electricity as a shunt contact. Crosspieces are also employed in the Navy or in "Mecano" building set to secure the crossing of two cables or halyards.

Figure 9:
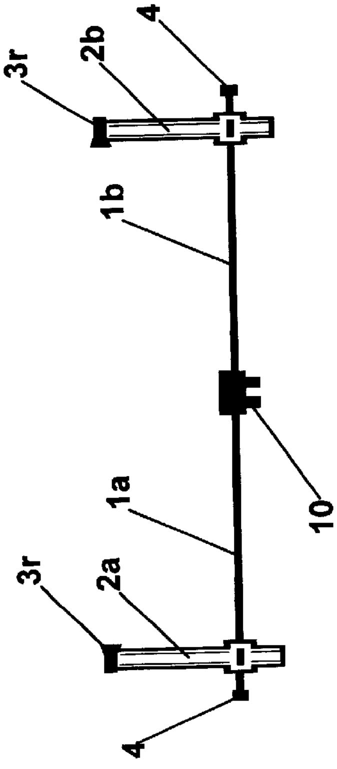
FIG. 9 is a side view of an assembler according to the invention wherein the support part is made of two distinct cylindrical portions connected end to end in a row by a coupler, each of said portions carrying one arm provided with a substantially elastic ring buffer.

FIG. 9 gives an example of length extension for the support part of an assembler by connecting end to end in a row two support parts 1*a* and 1*b* with the help of a coupler 8. Support part 1*a* is carrying movable arm 2*a* while support part 1*b* is carrying movable arm 2*b*. Both arms are provided with a substantially elastic ring buffer 3*r.* Of course, between said support parts 1*a* and 1*b* might be inserted the result of connecting end to end by other couplers 8 in a row several other support parts. These couplers might be as well electrical connecting devices as muffs for mechanical pipes or as cable links with locking devices such as screws or nuts. In this way, the maximum opening capacity of any assembler can be increased as much as it is liked since this capacity is all the larger that the support part length is larger. It matters little that said couplers are barriers against the mobility of said arms between the different support parts. Just placing one movable part on each of the two most extreme portions of so-extended support part is sufficient when a clamp with the maximum opening capacity is wanted.

Figure 12:
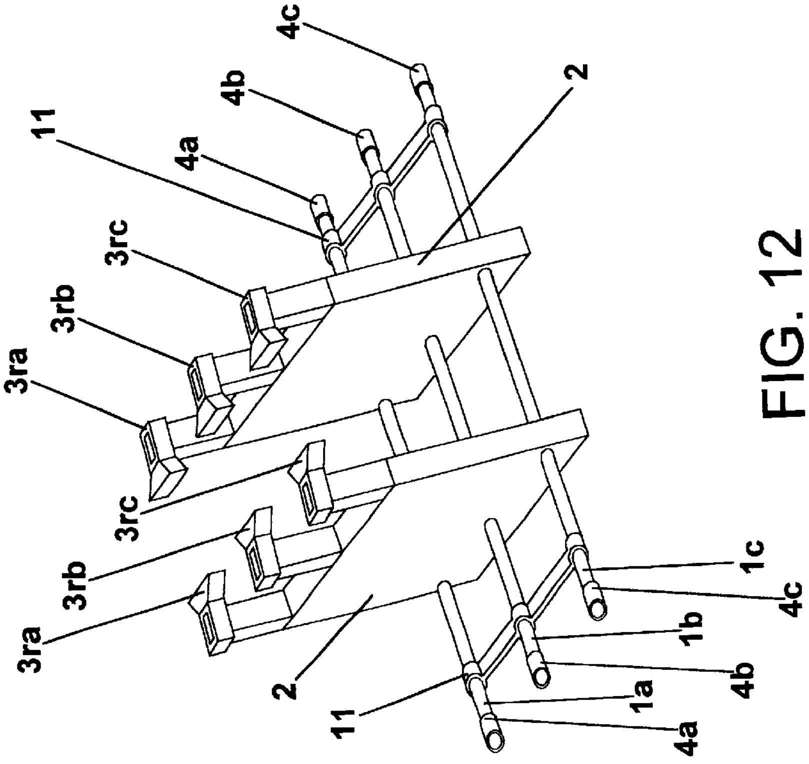
FIG. 12 shows a perspective of an assembler according to the invention wherein the support part has been split up into three parallel beams. These beams are linked to each other at each of their ends by a coupling device. The elastic buffer that carry each movable part is split up into three buffers which are coupled by the movable part itself.
Figure 13:
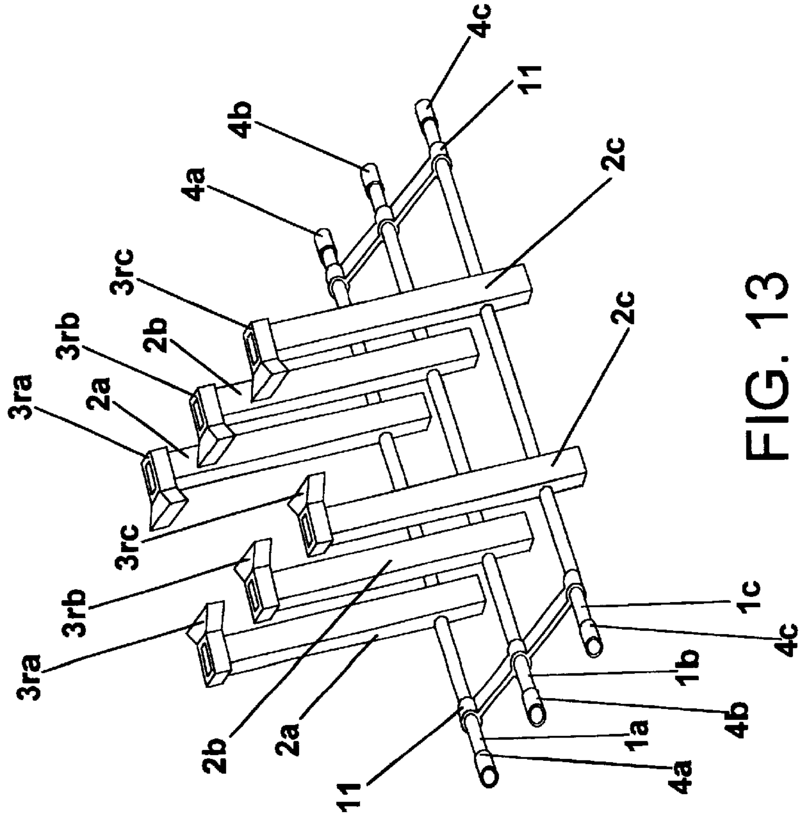
FIG. 13 shows a perspective of the assembler of FIG. 12 wherein each movable part is itself split up into three equivalent subparts.

In another arrangement of the assembler according to the invention including only two movable arms 2, the support part 1 is split up into several cylindrical parallel components, which constitute in fact so many parallel and homogeneous support parts. Said components are made interdependent at each of their ends by couplers which might look like little bars of electrical connecting devices when said components have almost the same diameter. Each of said arms might be running along all these components. Each arm has a wide pressing face. In a first kind of such an arrangement, the elastic buffer 3 secured to one or each of both arms is formed of one piece. FIG. 12 shows a second kind of such an arrangement, wherein each of both movable arms has secured to a substantially elastic buffer which is split up into several pieces, here three ring buffers r*ra,* 3*rb* and 3*rc.* Said ring buffers 3*ra,* 3*rb* and 3*rc* are located at a single distance from the medium plane, which contains the different, here three, cylindrical components 1*a,* 1*b* and 1*c* of said support part. Said ring buffers r*ra,* 3*rb* and 3*rc* are left working independently from each other. But in a third kind of arrangement, these pieces are sandwiched between the arm which is carrying them and a rigid linking plate meant for acting as a jaw towards objects to be clamped. The sandwich configuration with several substantially elastic buffer pieces sandwiched between the arm which is carrying them and a rigid plate turns out to provide a firmer grip than the single buffer configuration for the same clamping force. Of course, this implies a synergetic effect. FIG. 13 shows a variant of the arrangement of FIG. 12, wherein each of movable parts is itself split up into several blocks, here three blocks 2*a,* 2*b* and 2*c.* Each of these blocks is carried by one or several, here one, of the components of the support part. As said components constitute so many parallel support parts, it is as if several assemblers according to the invention were coupled together in parallel to make up a multipoint vice. In FIG. 12 and FIG. 13, each of the stops, which are fitted onto at the ends of the support part, is split into three pieces, 4*a,* 4*b* and 4*c,* as many as there are components for the support part. And the components of the support are made interdependent at each of their ends by couplers 11, which encircle them separately.

Figure 14:
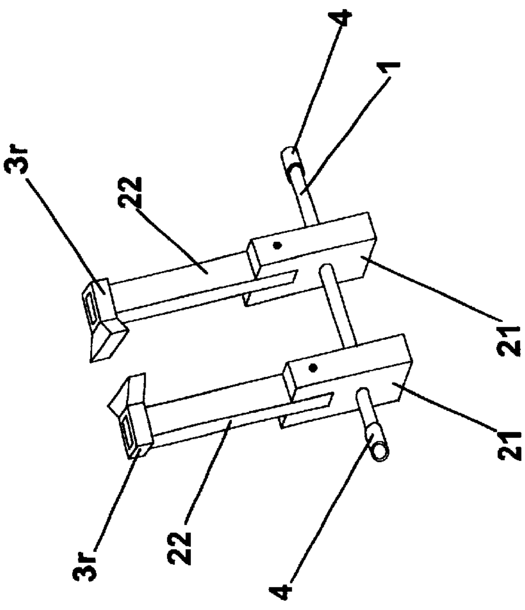
FIG. 14 shows a perspective of the assembler according to the invention wherein each movable part comprises two portions firmly secured to each other, a shackle including a transverse hole in which said support part is disposed and another portion carrying said elastic buffer.

FIG. 14 shows an assembler having two movable parts, each of them comprising two portions: one shackle 21 including the transverse hole in which the support part 1 is disposed and another portion 22 carrying a substantially elastic buffer 3*r.*

It is worth noting moreover that the device according to the invention might find many applications such as securing an apparatus to a support when said apparatus is made interdependent of or is constituting one of said arms.

It stands to reason that this invention was only described and illustrated on a purely explanatory and not in the least restrictive basis and that it will possible to make any variant of it without getting off its scope.

What is claimed is:

1. A method of making a device for holding an object by clamping the object while preventing damage thereto, said method comprising the steps of:

providing a cylindrical support part, providing two arms, each arm including a transverse hole and at least one of these arms carrying an elastic buffer secured thereto, said buffer having a contact face for contacting said object and having under its contact face a thickness large enough so that said buffer acts as a compression spring when said buffer contacts said object, and being resilient enough such that said contact face can flex and pivot to substantially conform to the surface of said object, and placing said arms on said support part such that said support part is disposed in said transverse holes of said two arms and at least one arm is movable along said support part, and said buffer is disposed at a distance from said support part with its contact face approximately at a right angle to said support part, and wherein said object may be held by said device by positioning said object between said arms and in contact with said elastic buffer, and manually exerting pressure on the back of said at least one movable arm, then stopping exerting pressure, which causes said at least one movable arm to tilt with respect to said support part such that a frictional force is created between said support part and an interior surface of the transverse hole of said at least one movable arm.

2. A device for holding an object by clamping the object while preventing damage thereto, said device comprising:

a cylindrical support part, and two arms, each arm including a transverse hole and at least one of these arms carrying an elastic buffer secured thereto, said buffer having a contact face for contacting said object and having under its contact face a thickness large enough so that said buffer acts as a compression spring when said buffer contacts said object, and being resilient enough such that said contact face can flex and pivot to substantially conform to the surface of said object, said support part being disposed within said transverse holes of said arms such that at least one of said arms is movable along said support part, and said buffer is disposed at a distance from said support part with its contact face approximately at a right angle to said support part, and wherein said object may be held by said device by positioning said object between said arms and in contact with said elastic buffer, and manually exerting pressure on the back of said at least one movable arm, then stopping exerting pressure, which causes said at least one movable arm to tilt with respect to said support part such that a frictional force is created between said support part and an interior surface of the transverse hole of said at least one movable arm.

3. The device of claim 2 wherein said elastic buffer includes a ring portion at an end of said buffer opposite said contact face, and said buffer is secured to said at least one arm by inserting said at least one arm into said ring portion such that said ring portion encircles said at least one arm.

4. The device according to claim 2 further comprising two additional movable arms, each additional arm having a transverse hole therethrough, and said arms being mounted on the support part with the support part being disposed within the transverse holes of the additional arms, and wherein the two first arms and the two additional arms along the support part are each provided with a respective said elastic buffer, and wherein the contact face of the elastic buffer of each of the two first arms face towards a first direction, and the contact face of the elastic buffer of each of the two additional arms face towards a second direction opposite the first direction.

5. The device according to claim 4, 2 further comprising, in addition to said four arms, a fifth and a sixth movable arms positioned adjacent each other along said support part so that said device could be used as a vertical helping hand, said fifth and sixth arms each being provided with a respective said elastic buffer, and wherein the contact faces of the elastic buffers of the fifth and sixth arms face in opposite directions.

6. The device according to claim 2, further comprising in addition to said two arms, two pairs of movable arms disposed in succession along said support part so that said device could be used as a horizontal helping hand, the pairs of movable arms being rotatable around said support part in at least two directions, and each of said two arms and said movable arms having one said elastic buffer secured thereto at a distance from said support part, and wherein the arms of each of said pairs of movable arms can be positioned so that the contact face of the buffer of one arm faces the contact face of the buffer of the other arm of the same pair.

7. The device according to claim 2, further comprising a removable stop fitted onto at least one end of said support part, said removable stop comprising a section of tubular supple sheath which frictionally engages with the outer surface of said support part.

8. The device according to claim 2, further comprising a coupler secured to the support part, said coupler holding another support part such that said another support part extends in a direction distinct from that of the first said support part, said another support part including at least one movable arm provided with a said elastic buffer.

9. The device according to claim 2, further comprising a coupler secured to the support part, said coupler holding other support parts parallel to the first support part, each of said other support parts carrying at least two arms, of which at least one is movable, and of which one is provided with one said elastic buffer.

10. The device according to claim 2, further comprising a coupler secured to the support part, said coupler holding another support part in a direction distinct from that of the first support part, said another support part including a second coupler and at least one movable arm provided with one said elastic buffer.

11. The device according to claim 2, wherein the support part is made of several beams which are connected end to end in a row by couplers, each of the outermost beams supporting at least one of said two arms.

12. The device according to claim 2, wherein said support part comprises several parallel beams which are disposed through respective transverse holes in said arms, said transverse holes being distributed in a line which is at a right angle to said arms.

13. The device according to claim 12, wherein at least one said elastic buffer is split up into several pieces.

14. The device according to claim 13, wherein the arm upon which is secured the split up elastic buffer is itself split up into several blocks each carried by one or several of said beams.

15. The device according to claim 2, wherein said at least one movable arm comprises two portions firmly secured to each other, a first portion including said transverse hole in which said support part is disposed and another portion carrying said elastic buffer.

16. A method for holding an object by clamping the object while preventing damage thereto, and which utilizes a device including a cylindrical support part and two arms, each arm including a transverse hole and at least one of these arms carrying an elastic buffer secured thereto, said buffer having a contact face for contacting said object and having under its contact face a thickness large enough so that said buffer acts as a compression spring when said buffer contacts said object, and being resilient enough such that said contact face can flex and pivot to substantially conform to the surface of said object, said support part being disposed within said transverse holes of said arms such that at least one of said arms is movable along said support part, and said buffer is disposed at a distance from said support part with its contact face approximately at a right angle to said support part, said method comprising the steps of:

positioning said object between said arms and in contact with said elastic buffer by sliding said at least one movable arm along said support part, so as to apply the contact face of said elastic buffer against a respective surface of said object, manually exerting pressure on the backs of said arms in the direction of said object, and stopping the exertion of pressure when sufficient resistance is felt, which causes said at least one movable arm to tilt with respect to said support part, such that a frictional force is created between said support part and an interior surface of the transverse hole of said arm, thereby locking said arm in place with respect to said support part and clamping said object between said arms.

17. The method according to claim 16, wherein said support part has secured thereto a coupler which supports another support part, said another support part carrying at least one movable arm, said at least one movable arm having a said elastic buffer secured thereto at a distance from the another support part and a transverse hole through which said another support part is fitted, said method further comprising the steps of:

applying the elastic buffer of the at least one movable arm supported on said another support part against a respective surface of said object, manually exerting pressure on the back of said at least one movable arm supported on said another support part, and stopping the exertion of pressure when sufficient resistance is felt, which causes said at least one movable arm supported on said another support part to tilt with respect to said another support part, such that a frictional force is created between said another support part and an interior surface of the transverse hole of said at least one movable arm secured thereto, thereby locking said at least one movable arm in place with respect to said another support part.

18. The method according to claim 16, wherein said support part has secured thereto a coupler which supports another support part, said another support part carrying at least one movable arm and another coupler, said at least one movable arm having a said elastic buffer secured thereto at a distance from the another support part and a transverse hole through which said another support part is fitted, said method further comprising the steps of applying the elastic buffer of the at least one movable arm supported on said another support part against a respective surface of said object, manually exerting pressure on the back of said at least one movable arm supported on said another support part, and stopping the exertion of pressure when sufficient resistance is felt, which causes said at least one movable arm supported on said another support part to tilt with respect to said another support part, such that a frictional force is created between said another support part and an interior surface of the transverse hole of said at least one movable arm secured thereto, thereby locking said at least one movable arm in place with respect to said another support part.

* * * * *

UNITED STATES PATENT AND TRADEMARK OFFICE
CERTIFICATE OF CORRECTION

PATENT NO. : 6,505,391 B1 
DATED : January 14, 2003
INVENTOR(S) : Philippe, Jean and Henri Berna It is certified that error appears in the above-identified patent and that said Letters Patent is hereby corrected as shown below:

<u>Title page,</u>
Item [60], Related U.S. Application Data, change "as" to -- on Sept. 3, 1992, as the National Stage of --; and insert -- , filed -- just before "on March 8., 1991".

<u>Column 1,</u>
Line 7, insert just after "abandoned" -- , which is a continuation of Ser. No. 07/938,211, filed Sept. 3, 1992, now abandoned, --;
Line 8, insert a comma before "filed";
Line 23, insert a period just after "tool";
Line 42, insert a space between "1907" and "in";
Line 54, at the beginning of the line change "nof" to -- of --;
Line 64, after "pages 27", insert -- and 28, in sight of figure 42) with cork pads at this place, by Trillat, cabinetmaking teacher, in his book entitled "Le Guide Pratique du Métier" ("The Practical Guide for Skill"), published by --.

<u>Column 2,</u>
Line 12, insert a hyphen between "Menuiserie" and "Ebénisterie";
Line 17, delete the space just after "No. 4,555,100";
Line 17, change "fled" to -- filed --;
Line 18, change "PCTIUS85/00420" to -- PCT/US85/00420 --;
Line 26, change "remaining" to -- remain --;
Line 45, insert a comma just after "arms";
Line 60, insert a period just after "fixed";
Line 66, insert a period just after "tool".

<u>Column 3,</u>
Line 9, insert a hyphen between "helping" and "hands";
Line 59, change "pin —shaped" to -- pin-shaped --;
Line 66, change "clothes peg" to -- clothespin --.

<u>Column 4,</u>
Lines 1 and 6, change "clothes peg" to -- clothespin --;
Line 4, insert an apostrophe just after "pliers";
Line 14, change "nSo as" to -- So that --;
Line 14, insert -- could -- between "arms" and "be";
Line 29, change "object. The" to -- object; the --;
Line 31, change "object. This" to -- object; this --;
Line 48, start what follows "direction." on the next line;
Line 51, change "unlike" to -- as --;
Line 56, change "which" to -- that --.

UNITED STATES PATENT AND TRADEMARK OFFICE
CERTIFICATE OF CORRECTION

PATENT NO. : 6,505,391 B1

DATED : January 14, 2003
INVENTOR(S) : Phillippe, Jean and Henri Berna

It is certified that error appears in the above-identified patent and that said Letters Patent is hereby corrected as shown below:

Column 5,
Line 5, change "come" to -- face comes --;
Line 10, delete "of" between "Exerting" and "pressure";
Line 12, insert a period just after "object";
Line 23, insert -- and pushed apart -- between "part" and the period;
Line 26, delete "the" at the end of the line;
Lines 50 and 65, change "parts" to -- arms --;
Line 53, change "afoot" to -- a foot --;
Line 57, change "an" to -- a --;
Lines 59 and 64, insert a hyphen between "helping" and "hand".

Column 6,
Line 7, insert a comma after "clamping";
Line 8, insert a comma after "buffer";
Line 22, start what follows "helping-hand." on the next line;
Lines 23, 25, 27, 30, 34, 35 and 44, insert a hyphen between "helping" and "hands";
Lines 29 and 31, change "crocodile" to -- alligator --;
Line 58, change "part" to -- arm --.

Column 7,
Line 4, insert a hyphen between "helping" and "hands";
Line 6, insert a comma just after "couplers";
Line 10, insert -- of -- between "arrangement" and "dimensions";
Line 11, insert a hyphen between "big" and "section";
Line 14, insert a hyphen between "radial" and "clamping";
Line 14, insert a comma just after "clamping";
Line 27, insert a hyphen between "T" and "clamping";
Line 28, insert a hyphen between "cross" and "clamping";
Line 33, at the end of the line, insert a hyphen just after "radial";
Line 34, insert a hyphen between "T" and "one";
Line 35, insert a hyphen between "cross" and "one";
Line 35, insert a hyphen between "radial" and "one";
Line 36, at the beginning of the line, change "parts" to -- arms --;
Line 36, change "over lappers" to -- overlappers --;
Line 36, insert a hyphen between "radial" and "clamping";
Line 41, change "assembleur" to -- assembler --;
Line 53, change "covering clamping" to -- cover-clamping --;
Line 57, insert a colon just after "surface is".

UNITED STATES PATENT AND TRADEMARK OFFICE

CERTIFICATE OF CORRECTION

PATENT NO. : 6,505,391 B1
DATED : January 14, 2003
INVENTOR(S) : Phillippe, Jean and Henri Berna It is certified that error appears in the above-identified patent and that said Letters Patent is hereby corrected as shown below:

Column 8,
Line 1, change "covering clamping" to -- cover-clamping --;
Line 18, change "objects d'art" to -- objets d'art --;
Line 28, insert a hyphen between "angle" and "clamping";
Line 28, insert a hyphen at the end of the line after "staple";
Line 29, insert a hyphen between "bridge" and "clamping";
Line 34, change "of holding" to -- to hold --;
Line 42, change "set. The" to -- set; the --;
Line 44, change "set. This" to -- set; this --;

Column 9,
Lines 13 and 17, insert a hyphen between "helping" and "hand";
Line 57, change "hole. Said" to -- hole; said --;

Column 10,
Line 13, start what follows " "assembler"." on the next line;
Line 31, change "needing" to -- the need --;

Column 11,
Line 8, insert a period just after "environment";
Line 43, change "8-9. The" to -- 8-9; the --;
Line 45, change "8-9. These" to -- 8-9; these --;
Line 47, replace the period with a comma;

Column 12,
Line 22, insert -- and pushed apart -- between "support part" and the period;
Line 25, delete "the" between "third one for" and "clamping";
Line 28, insert a comma just after "2*f*";
Line 29, insert a comma just after " "holder" ";
Line 30, change "over dapper" to -- overlapper --;
Line 62, insert a hyphen between "radial" and "clamping";

Column 13,
Line 17, insert a hyphen between "cross" and "clamping";
Line 22, insert a hyphen between "radial" and "clamping";
Line 39, change "8" to -- 10 --;
Line 43, change "8" to -- 10 -- after "couplers";

UNITED STATES PATENT AND TRADEMARK OFFICE

CERTIFICATE OF CORRECTION

PATENT NO. : 6,505,391 B1 
DATED : January 14, 2003
INVENTOR(S) : Phillippe, Jean and Henri Berna It is certified that error appears in the above-identified patent and that said Letters Patent is hereby corrected as shown below:

Column 14,
Lines 2 and 6, change “r*ra*” to -- 3*ra* -- after “buffers”;
Line 40, insert -- be -- between “will” and “possible”;

Column 15,
Line 48, delete “2” after “4,”;
Lines 51 and 59, insert a hyphen between “helping” and “hand”;
Line 56, insert a comma just after “comprising”;

Column 18,
Line 10, insert a colon just after “of”.

Signed and Sealed this

Fourth Day of April, 2006

JON W. DUDAS
*Director of the United States Patent and Trademark Office*